(12) United States Patent
Denkmeier et al.

(10) Patent No.: US 12,115,574 B2
(45) Date of Patent: Oct. 15, 2024

(54) BENDING PRESS AND METHOD FOR OPERATING A BENDING PRESS

(71) Applicant: TRUMPF Maschinen Austria GmbH & Co. KG., Pasching (AT)

(72) Inventors: Thomas Denkmeier, Traun (AT); Christian Kurz, Linz (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 0 days.

(21) Appl. No.: 17/255,053

(22) PCT Filed: Jul. 25, 2019

(86) PCT No.: PCT/AT2019/060245
§ 371 (c)(1),
(2) Date: Dec. 22, 2020

(87) PCT Pub. No.: WO2020/019012
PCT Pub. Date: Jan. 30, 2020

(65) Prior Publication Data
US 2021/0121930 A1   Apr. 29, 2021

(30) Foreign Application Priority Data

Jul. 27, 2018   (AT) ............................. A 50659/2018

(51) Int. Cl.
*B21D 5/04* (2006.01)
*B21D 5/02* (2006.01)
(Continued)

(52) U.S. Cl.
CPC ................ *B21D 5/04* (2013.01); *B21D 5/02* (2013.01); *B21D 55/00* (2013.01); *F16P 3/001* (2013.01)

(58) Field of Classification Search
CPC ........ B21D 55/00; B21D 5/02; B21D 5/0209; B21D 5/0236; B21D 5/0254; B21D 5/04;
(Continued)

(56) References Cited

U.S. PATENT DOCUMENTS 6,316,763 B1   11/2001   Appleyard et al.
6,752,253 B2   6/2004   Fiessler
(Continued)

FOREIGN PATENT DOCUMENTS

CN   105916606 A   8/2016
CN   107107142 A   8/2017
(Continued)

OTHER PUBLICATIONS

International Search Report in PCT/AT2019/060245, mailed Nov. 18, 2019.
(Continued)

*Primary Examiner* — Debra M Sullivan
*Assistant Examiner* — Matthew Stephens
(74) *Attorney, Agent, or Firm* — Collard & Roe, P.C.

(57) ABSTRACT

The invention relates to a bending press (10) for bending a workpiece (19), comprising
a first platform (1) with a first tool mount (11) and a second platform (2) with a second tool mount (12), wherein one of the platforms (1) is movable relative to the other platform (2) for performing a working movement,
a first safety device (20) for creating a light barrier (27) extending between the tool mounts (11, 12) transversely to the working movement of the movable platform (1), wherein the first safety device (20) has a first mount (21) and a second mount (22), wherein one of the mounts (21) carries a light emitter (25) and the other mount (22) carries a light receiver (26), and
(Continued)

Figure 1:
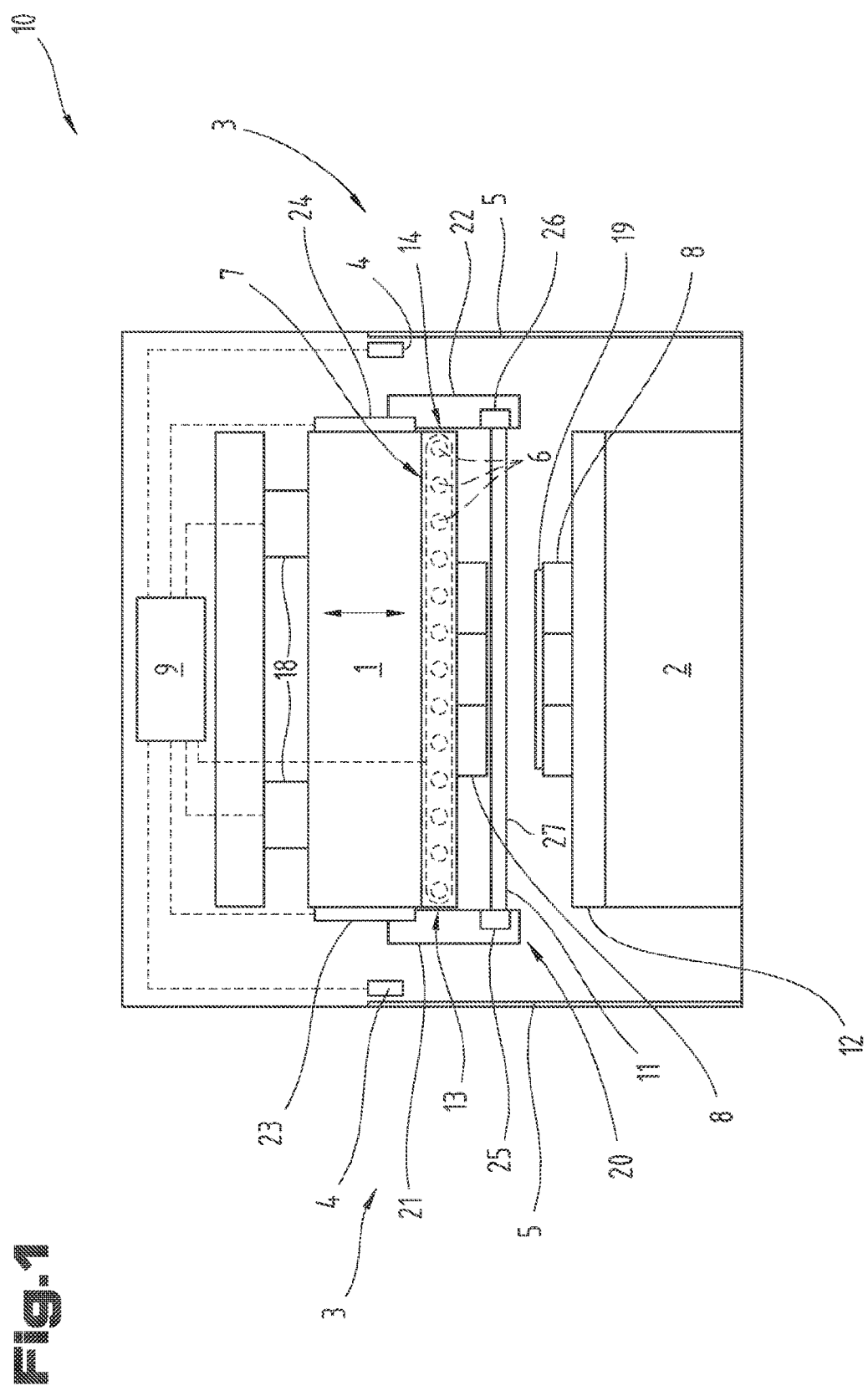

wherein the first mount (21) is arranged on a first side of the first platform (1) and is adjustable relative to the first platform (1) by a first adjustment drive (23), a controller (9) that is connected to the first adjustment drive (23), characterized in that the first tool mount (11) is designed in the form of a guide rail, which has at its first end a first front side opening (13) for changing a bending tool (8), and that the access for changing a bending tool (8) via the first front side opening (13) is obstructed in a first relative position of the first mount (21) to the first platform (1) and is unblocked in a second relative position of the first mount (21) to the first platform 1.

20 Claims, 3 Drawing Sheets

(51) Int. Cl.
*B21D 55/00* (2006.01)
*F16P 3/00* (2006.01)

(58) Field of Classification Search
CPC ......... B21D 7/16; B21D 11/22; B30B 15/285; F16P 3/001; F16P 3/005; F16P 3/02; F16P 3/04; F16P 3/08; F16P 3/144; B23Q 17/2216; B23Q 17/2225
See application file for complete search history.

(56) References Cited

U.S. PATENT DOCUMENTS

| | | | |
|---|---|---|---|
| 6,786,145 B2 | 9/2004 | Kilian et al. | |
| 7,446,301 B2 | 11/2008 | Fischereder | |
| 7,454,935 B2 | 11/2008 | Braune et al. | |
| 8,119,964 B2 | 2/2012 | Hufnagel et al. | |
| 9,421,678 B2 | 8/2016 | Fiessler | |
| 10,144,049 B2 | 12/2018 | Jansen et al. | |
| 10,507,505 B2 | 12/2019 | Fischereder et al. | |
| 2002/0104958 A1* | 8/2002 | Fiessler | B30B 15/285 250/221 |
| 2004/0020255 A1* | 2/2004 | Kilian | B21D 5/02 72/1 |
| 2007/0164200 A1* | 7/2007 | Fischereder | B21D 55/00 250/221 |
| 2013/0269962 A1* | 10/2013 | Fiessler | B30B 15/161 173/1 |
| 2015/0160361 A1* | 6/2015 | Gondo | G01V 3/00 72/1 |
| 2015/0314364 A1* | 11/2015 | Fiessler | B21D 28/00 72/1 |
| 2018/0126682 A1 | 5/2018 | Fiessler et al. | |

FOREIGN PATENT DOCUMENTS

| | | | | |
|---|---|---|---|---|
| DE | 197 17 299 A1 | 2/1998 | | |
| DE | 101 23 562 A1 | 11/2002 | | |
| DE | 103 09 399 A1 | 9/2004 | | |
| DE | 697 35 472 T2 | 12/2006 | | |
| DE | 20 2007 002 078 U1 | 4/2007 | | |
| DE | 10 2007 006 306 A1 | 7/2008 | | |
| DE | 202010017960 U1 * | 6/2013 | ............. | F16P 3/142 |
| EP | 1 259 340 B1 | 3/2005 | | |
| EP | 2 644 962 A1 | 10/2013 | | |
| EP | 3 321 557 A1 | 5/2018 | | |
| GB | 1512082 A * | 5/1978 | ............... | F16P 3/08 |
| GB | 2253453 A * | 9/1992 | ............... | F16P 3/04 |
| JP | H05277564 A | 10/1993 | | |
| JP | H0726011 A | 1/1995 | | |
| JP | 2013022645 A | 2/2013 | | |
| JP | 2014097530 A1 | 5/2014 | | |
| JP | 2015521955 A | 8/2015 | | |
| JP | 2014097530 A * | 2/2017 | ............... | B21D 5/02 |
| WO | 2005/030410 A1 | 4/2005 | | |
| WO | 2015/081359 A1 | 6/2015 | | |
| WO | 2017/064195 A1 | 4/2017 | | |

OTHER PUBLICATIONS

International Search Report in PCT/AT2019/060247, mailed Dec. 6, 2019.

* cited by examiner

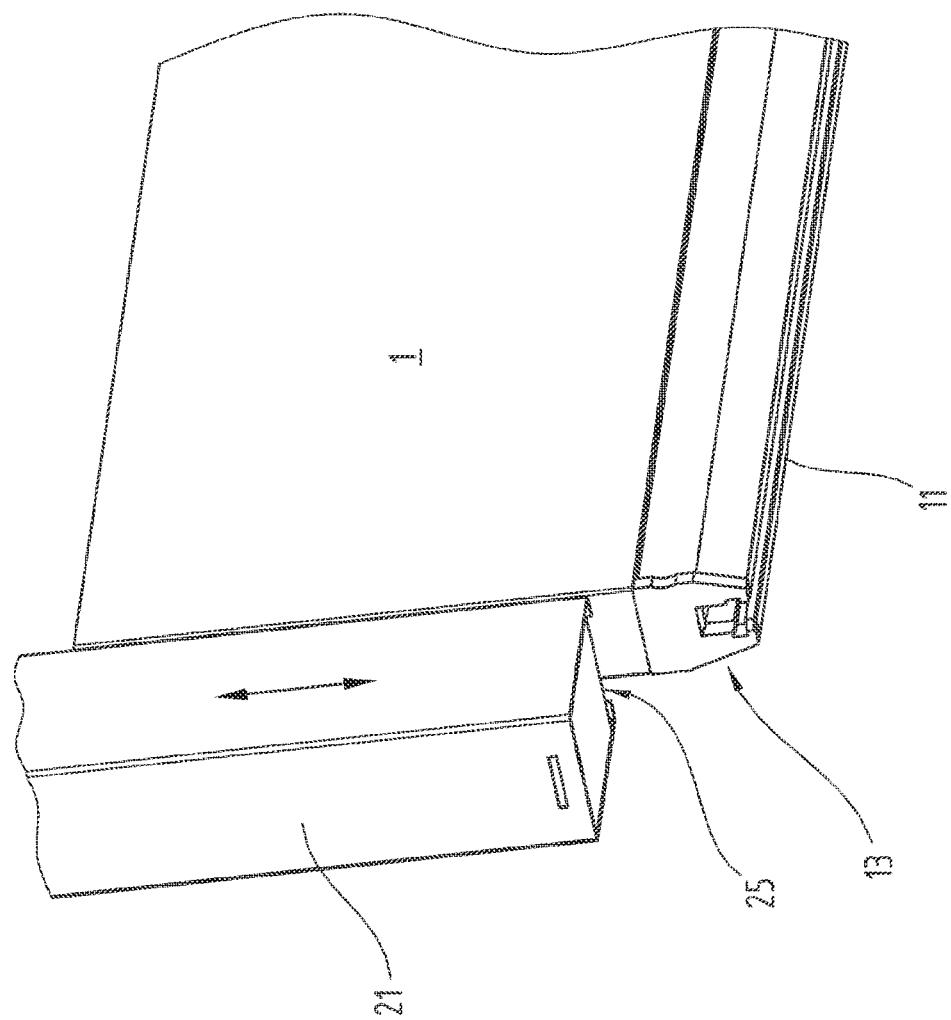

BENDING PRESS AND METHOD FOR OPERATING A BENDING PRESS

CROSS REFERENCE TO RELATED APPLICATIONS

This application is the National Stage of PCT/AT2019/060245 filed on Jul. 25, 2019, which claims priority under 35 U.S.C. § 119 of Austrian Application No. A 50659/2018 filed on Jul. 27, 2018, the disclosure of which is incorporated by reference. The international application under PCT article 21(2) was not published in English.

The invention relates to a bending press according to the preamble of claim 1 and a method for operating a bending press.

Bending presses are increasingly equipped with safety devices which are meant to prevent undesired collisions of a bending tool with an object or the jamming of a finger or a hand of an operator between bending tools or between a bending tool and the workpiece to be bent. Safety devices in the form of light barriers require mounts on either side of the press beam for the light emitter and light receiver, whereby the safety device takes up a lot of space in said side regions.

In this regard, the mounts are adjustable, whereby an automatic and flexible positioning of the light barrier is made possible, in each case dependent on the bending tool used. In this context, it is known from the prior art that an operator enters the tool height via a user interface of the bending press, and that the target position for the light barrier is automatically calculated from the tool height.

The tool mounts of bending presses are often configured in the form of guide rails. Changing bending tools into and/or out of the tool mount of a bending press is carried out by an operator inserting the mounting part of the bending tool into the slot of the guide rail at the desired location. However, there are bending tools in which such an approach is impossible due to their high weight and/or their shape. This means that such tools cannot be set up via the slot of the guide rail, i.e. in a direction transverse to the longitudinal extension of the rail.

The object of the present invention was to overcome the disadvantages of the prior art and to provide a bending press, by means of which tools with a specially configured mounting section, as it is particularly common for heavier and/or larger tools, can also be used in bending presses with a safety device of the light barrier type. Changing, i.e. inserting and/or removing such bending tools into and/or out of the tool mount of the bending press shall be possible easily and with only little effort. Simultaneously, the bending press should meet high safety standards.

This object is achieved by a bending press of the initially mentioned type in that the first tool mount is configured in the form of a guide rail, which has at its first end a first front side opening for changing a bending tool, and that the access for changing a bending press via the first front side opening is obstructed in a first relative position of the first mount to the first platform and is unblocked in a second relative position of the first mount to the first platform.

In this regard, the mount is adjustable between the first relative position (in particular a working position) and the second relative position (which can also be referred to as parking position) by means of the adjustment drive, A platform can be understood to be any structure which is suitable for carrying or integrally forming a tool mount and for absorbing forcing which are transferred during the bending operation. The first platform and/or the second platform can be particularly be formed as press beams and/or have a longitudinal extension running transversely to the working movement and/or pressing direction.

The front side opening makes it possible to change bending tools, which cannot be inserted transversely to the longitudinal extension of the guide rail due to the shape of the mounting section, which may be provided e.g. with pins for engaging with rills or grooves of the guide rail. The bending tool is inserted with its mounting section into the guide rail parallel to the longitudinal extension of said guide rail. Simultaneously, the safety device is configured such that it unblocks the region occupied by it in the working position (corresponds to the first relative position) when a tool change is to be carried out. To this end, the adjustment drive is controlled by the controller, whereby the first mount is displaced from the first relative position into the second relative position.

In this regard, the safety device is configured such that the position of the light barrier, which is determined by the position of the light emitter at one of the mounts, can be set relative to the first tool mount and/or the tool held therein. A (complete or partial) interruption of the light barrier causes a shadow that is detected by means of the light receiver. The controller connected to the light receiver stops or slows the working movement of the bending press depending on a detected shadow.

The setting of the light barrier position takes place by moving the mount(s) transversely to the longitudinal extension of the guide rail of the tool mount. The setting movement of a mount for positioning the light barrier and the adjustment movement between first and second relative position are carried out by means of the same adjustment drive and along the same direction, which is preferably parallel to the direction of the working movement of the bending press and is preferably vertical.

The advantage of the invention is that the (first and/or—as explained below—the second) mount can be moved automatically into the second relative position and thus automatically unblocks the access for changing a bending tool.

"Obstructed access for changing a bending tool via the first front side opening" means that the front side opening is entirely or partially covered (by the mount) and/or a region required for the tool change is occupied by the mount. Accordingly, an "unblocked access" means that the front side opening and the region following it required for the tool change are unblocked by the mount.

The adjustment drive(s) can be configured in particular as a linear drive, e.g. a toothed rack comprising a pinion.

The light barrier extends substantially parallel to the first tool mount and/or guide rail.

A preferred embodiment is characterized in that the second mount is arranged on a second side of the first platform opposite the first side and can be adjusted relative to the first platform by a second adjustment drive, wherein the controller is connected to the second adjustment drive, and that the guide rail has at its second end a second front side opening for changing a bending tool, and that the access for changing a bending tool via the second front side opening is obstructed in a first relative position of the second mount to the first platform and is unblocked in a second relative position of the second mount to the first platform. With regard to the second mount, the same measures as for the first mount are taken here, so that tools can also be changed (i.e. inserted and/or removed) via the other end of the guide rail.

A preferred embodiment is characterized in that in the first relative position of the first mount to the first platform, the first front side opening of the guide rail is covered at least partially, preferably entirely, by the first mount, and/or that in the first relative position of the second mount to the first platform, the second front side opening of the guide rail is covered at least partially, preferably entirely, by the second mount.

A preferred embodiment is characterized in that the first tool mount is an upper tool mount and the second tool mount is a lower tool mount. It has been shown that an arrangement of the first safety device and/or the mounts on the upper, movable platform is more space-saving, in particular when bending operations are carried out in the end region of the guide rail.

A preferred embodiment is characterized in that the first platform is movable relative to the second platform. Here, the second platform is stationary, and the first platform carries out the working movement relative to the stationary platform.

A preferred embodiment is characterized in that the first adjustment drive can be actuated independently of the second adjustment drive. This way, it is only necessary to adjust the mount in whose region a tool change is to take place. Additionally, fine adjustments between light emitter and light receiver can be performed.

A preferred embodiment is characterized in that the light emitter and/or the light receiver is/are arranged in the lower region of the respective mount and is/are arranged above the front side opening(s) of the guide rail when the respective mount is in the second relative position. Thus, the safety device can be "parked" at least on one side of the platform, entirely above the tool mount.

A preferred embodiment is characterized in that the first tool mount has a clamping device for fixating one or multiple bending tool(s) inserted in the guide rail, wherein the clamping device can be actuated between a clamping state and a releasing state, and that the clamping device is actuatable by the controller and/or the state of the clamping device is readable by the controller. The (detected) state of the clamping device can be used by the controller for adjusting the mount(s) by means of the adjustment drive(s). In a releasing state and/or when releasing the clamping device, the mount can be automatically brought into the second relative position (parking position), whereby an immediate tool change e.g. by the operator is made possible.

A preferred embodiment is characterized in that the bending press comprises a second safety device, which can be brought into a state performing a safety function and into a non-securing state, and that the safety device comprises a sensor for detecting the current state of the safety device, which sensor is connected to the controller, and that the controller is configured to bring the first mount and/or the second mount—in dependence on the state of the second safety device detected by the sensor, preferably if in a non-securing state—into the second relative position.

A preferred embodiment is characterized in that the bending press comprises a covering, in particular a door or a window, as a second safety device, which covering can be moved between a closed position, in which the sideward access to the interior of the bending press is obstructed or impeded (corresponds to the safety function), and an open position. A sensor connected to the controller detects the position of the covering (open and/or closed). Depending on the detected position (open), the controller can now move the mount into the second relative position (parking position) by means of the adjustment drive. For example, when an operator opens the covering, in particular the door, the mount can be automatically moved into the second relative position, whereby the access for the tool change is immediately unblocked.

A preferred embodiment is characterized in that, in an operating mode, which can preferably be deactivated, the controller is configured to automatically move—by controlling the first and/or second adjustment drive—the first mount and/or the second mount into the second relative position when the covering is brought into an open position or is in an open position and/or when the clamping device is brought into a releasing state or is in a releasing state. The embodiment, in which the mount(s) is/are moved into the second relative position only when both preconditions are met, i.e. covering open and clamping device released, is particularly preferred. This reflects the clear intention of the operator to perform a tool change.

A preferred embodiment is characterized in that, in a first operating mode, the controller is configured—for performing a working movement—to move the first platform in the direction of the second platform at a first speed, and to move the first mount and/or second mount into the second relative position immediately before the start of the bending operation on the workpiece or when the distance between a bending tool held by the first tool mount and the workpiece to be processed falls below a predefined value, which is preferably not more than 20 mm, preferably not more than 10 mm. This option is preferred when it is desired to bend laterally past the (upper) tool mount, and the (e.g. vertical) box flap does not (yet) lead to a collision with the first safety device, in particular the mount, before the bending. The first operating mode thus serves to prevent a collision of the safety device with the workpiece during the bending (up) operation. However, the first safety device is active up to and/or shortly before the collision to be expected, which is why the working movement can take place at a relatively high speed at least up to this point in time.

A preferred embodiment is characterized in that, in a second operating mode, the controller is configured to move the first mount and/or the second mount into the second relative position or to leave them in the second relative position, before and/or while the first platform—for performing a working movement—is moved in the direction of the second platform at a second speed. This option is selected when it is desired to bend laterally past the (upper) tool mount, and the (e.g.) vertical box flap leads to a collision with the first safety device even before bending. The second operating mode thus serves to prevent a collision of the safety device with the workpiece already before bending. As such a working movement takes place without an active safety device, the second speed is preferably selected to be relatively low.

The selection of the first and/or second operating mode is preferably carried out by the controller, depending on the respective bending program and/or the shape of the workpieces (being produced) and/or the initial workpieces.

A preferred embodiment is characterized in that the first speed is greater, preferably at least 1.5 times greater, particularly preferably at least 2 times greater, than the second speed.

A preferred embodiment is characterized in that the light barrier is formed by at least one light beam widened to a light field, and/or comprises multiple light beams, preferably extending in a parallel manner. In the first case, a lens can be used for widening an individual light beam.

Preferably, a homogeneous light field is (transverse to the dispersion direction of the light barrier). The term "light barrier" is therefore understood to be any type of light beam(s) or light field(s)—of one or multiple individual light beams/fields. The principle that a partial or complete disruption of the light barrier (by foreign objects and/or a hand or a finger of an operator etc.) makes it possible for the light receiver to detect a darkening and/or a shadow is used here.

A preferred embodiment is characterized in that the light receiver is an image receiver, preferably a camera.

The object is also achieved by a method for operating a bending press according to the invention, wherein the controller moves the first mount and possibly the second mount by controlling the adjustment drive(s) into the second relative position.

A preferred embodiment is characterized in that, in an operating mode, which can preferably be deactivated, the controller automatically moves—by controlling the first and/or second adjustment drive—the first mount and/or the second mount into the second relative position when the covering is brought into an open position or is in an open position and/or when the clamping device is brought into a releasing state or is in a releasing state.

A preferred embodiment is characterized in that, in a first operating mode, the controller—for performing a working movement—moves the first platform in the direction of the second platform at a first speed, and moves the first mount and/or second mount into the second relative position immediately before the start of the bending operation or when the distance between a bending tool held by the first tool mount and the workpiece to be processed falls below a predefined value, which is preferably not more than 20 mm, preferably not more than 10 mm.

A preferred embodiment is characterized in that, in a second operating mode, the controller moves the first mount and/or the second mount into the second relative position or leaves them in the second relative position, before and/or while the first platform—for performing a working movement—is moved in the direction of the second platform at a second speed.

A preferred embodiment is characterized in that the first speed is greater, preferably at least 1.5 times greater, particularly preferably at least 2 times greater, than the second speed.

For the purpose of better understanding of the invention, it will be elucidated in more detail by means of the figures below.

Figure 2:
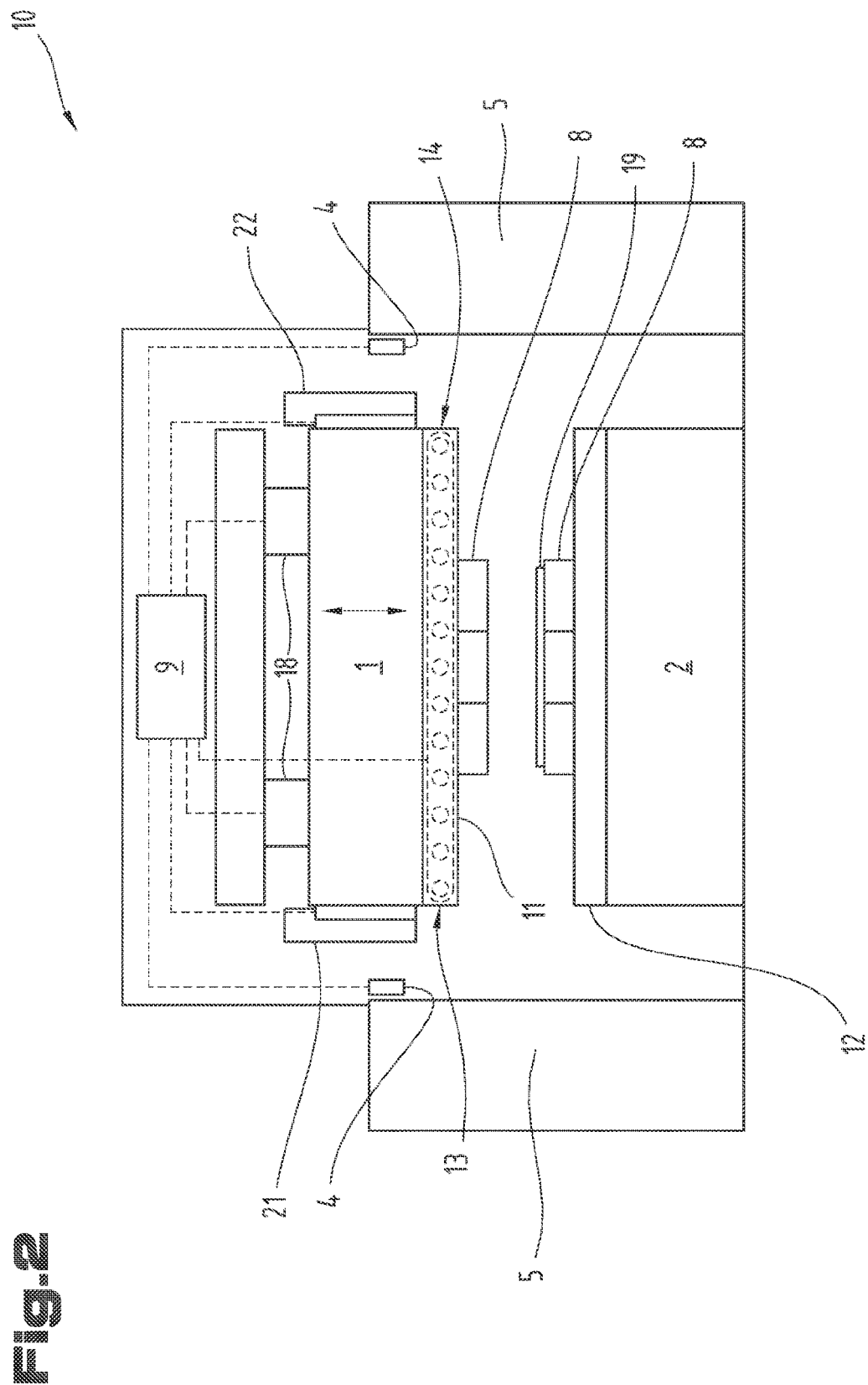

These show in a respectively very simplified schematic representation:

FIG. 1 a bending press according to the invention;

FIG. 2 the bending press of FIG. 1 with open, lateral coverings;

FIG. 3 the front side opening of the guide rail.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

FIG. 1 shows a bending press 10 for bending a workpiece 19, here in the form of a press brake. A first (upper) platform 1 with a first tool mount 11 is movable relative to a second (lower) platform 2 with a second tool mount 12 for performing a working movement (see double arrow). The working movement is effected by the controller 9, which is connected to the press drive 18 and controls the same.

In the embodiment shown, the first tool mount 11 is an upper tool mount and the second tool mount 12 is a lower tool mount. The first platform 1 is movable relative to the second, stationary platform 2.

The bending press 10 comprises a first safety device 20 for creating a light barrier 27 extending between the tool mounts 11, 12 transversely to the working movement of the movable platform 1. The first safety device 20 has a first mount 21 and a second mount 22 (located opposite), wherein one of the mounts 21 carries a light emitter 25 and the other mount 22 carries a light receiver 26. Light emitter 25 and light receiver 26 are also connected to the controller 9 (not shown).

The first mount 21 is arranged on a first side of the first platform 1 and adjustable relative to the first platform 1 by means of a first adjustment drive 23. The second mount 22 is arranged on a second side of the first platform 1 opposite the first side, and adjustable relative to the first platform 1 by means of a second adjustment drive 24.

The controller 9 is connected to the first adjustment drive 23 and the second adjustment drive 24.

In this regard, the first safety device 20 is configured such that the position of the light barrier 27, which is determined by the position of the light emitter 25 at one of the mounts, can be set relative to the first tool mount 11 and/or the tool 8 held therein. A (complete or partial) interruption of the light barrier 27 causes a shadow that is detected by means of the light receiver 26. The controller 9 connected to the light receiver 26 stops or slows the working movement of the bending press 10 (controlling of the press drive 18) depending on a detected shadow.

At least the first tool mount 11, preferably also the second tool mount 12, is designed in the form of a guide rail, which has at its first end a first front side opening 13 for changing a bending tool 8 (also see FIG. 3).

The access for changing a bending tool 8 via the first front side opening 13 is obstructed in a first relative position of the first mount 21 to the first platform 1 (FIG. 1) and unblocked in a second relative position of the first mount 21 to the first platform 1 (FIGS. 2 and 3).

The guide rail can also have at its second end a second front side opening 14 for changing a bending tool 8. The second mount 22 can—like the first mount—obstruct (FIG. 1) or unblock (FIG. 2) the access to the front side opening 14.

In the first relative position, as can be seen in FIG. 1, the first front side opening 13 of the guide rail is at least partially, here even completely, covered by the first mount 21. Likewise, the second front side opening 14 is covered by the second mount 22.

The first adjustment drive 23 is preferably actuatable independently of the second adjustment drive 24, so that only the mount on the side, on which the tool change takes place, has to be moved into the second relative position (parking position).

The light emitter 25 and/or the light receiver 26 are arranged in the lower region of the respective mount 21, 22. In the second relative position (FIGS. 2 and 3) of the respective mount 21, 22, the light emitter and/or light receiver are therefore located above the front side opening 13, 14 of the guide rail (see FIG. 3, in particular).

From FIGS. 1 and 2 it is further evident that the first tool mount 11 has a clamping device 7 for fixating one or multiple bending tool(s) 8 inserted in the guide rail. The clamping device 7 is actuatable between a clamping state (clamping the bending tool) and a releasing state. In this regard, the clamping device 7 is actuatable by the controller 9 and/or the state of the clamping device 7 is readable by the controller 9. The connection between controller 9 and clamping device 7 is adumbrated by a dashed line.

The clamping device may have a plurality of clamping elements 6, e.g. in the form of pins, which are, for example, pressed into the interior of the guide rail and against the mounting section of bending tool by a hydraulic drive.

The bending press 10 may also have at least one second safety device 3, which can be brought into a state performing a safety function and into a non-securing state. In this regard, the second safety device 3 may comprise a sensor 4 for detecting the current state of the safety device 3, which sensor is connected to the controller 9. The controller 9 may preferably be configured to bring the first mount 21 and/or the second mount 22—in dependence of the state of the second safety device 3 detected by the sensor 4, preferably if in a non-securing state—into the second relative position.

The second safety device may—as shown in the preferred embodiment of FIG. 1—be designed e.g. in the form of a covering 5, in particular a door or a window, and be movable between a closed position, in which the lateral access to the interior of the of the bending press 10 is obstructed or impeded (FIG. 1), and an open position (FIG. 2).

In an operating mode, which can preferably be deactivated, the controller 9 can be configured, in particular programmed, to automatically move—by controlling the first and/or second adjustment drive 23, 24—the first mount 21 and/or the second mount 22 into the second relative position when the covering 5 is brought into an open position or is in an open position (FIG. 2) and/or when the clamping device 7 is brought into a releasing state or is in a releasing state. This makes changing a bending tool (via a front side opening) significantly easier e.g. for an operator, as moving the mount back and the unblocking of the access caused thereby can be carried out automatically.

In a further, first operating mode, the controller 9 may be configured and/or programmed to move the first platform 1 in the direction of the second platform 2 at a first speed for performing a working movement, and to move the first mount 21 and/or second mount 22 into the second relative position immediately before the start of the bending operation on the workpiece 19 or when the distance between a bending tool 8 held by the first tool mount 11 and the workpiece 19 to be processed falls below a predefined value, which is preferably not more than 20 mm, preferably not more than 10 mm. In the second relative position, the corresponding mount does not hinder the bending operation and a bending up of the workpiece can take place in a region that is on the side of the front side opening.

In a second operating mode (working mode), the controller can be configured, in particular programmed, to move the first mount 21 and/or the second mount 22 into the second relative position or to leave them in the second relative position, before and/or while the first platform 1—for performing a working movement—is moved in the direction of the second platform 2 at a second speed. This operating mode is used in cases, in which a collision of the mount with the workpiece would take place even before the actual bending.

The first speed is greater, preferably at least 1.5 times greater, particularly preferably at least 2 times greater, than the second speed. Due to the deactivated safety function (of the first safety device) in the second operating mode, the working movement is carried out more slowly here.

The light barrier 27, in particular laser light barrier, can be formed by at least one light beam widened to a light field, and/or comprise multiple light beams, preferably extending in a parallel manner. The light receiver 26 may be an image receiver, preferably a camera.

The invention also relates to a method for operating a bending press 10, in which method the controller 9 moves the first mount 21 and optionally the second mount 22 by controlling the adjustment drive(s) 23, 24 into the second relative position. The corresponding method steps have already been described at the beginning and arise from the preceding description of the figures. In order to avoid repetitions, reference is therefore made at this point to the corresponding text passages.

LIST OF REFERENCE NUMBERS 1 first platform
2 second platform
3 second safety device
4 sensor
5 covering
6 clamping elements
7 clamping device
8 bending tool
9 controller
10 bending press
11 first tool mount
12 second tool mount
13 first front side opening
14 second front side opening
18 press drive
19 workpiece
20 first safety device
21 first mount
22 second mount
23 first adjustment drive
24 second adjustment drive
25 light emitter
26 light receiver
27 light barrier

The invention claimed is:

1. A bending press for bending a workpiece, the bending press comprising:
   a first platform with a first tool mount and a second platform with a second tool mount, wherein one of the platforms is movable relative to the other platform for performing a working movement,
   a first safety device for creating a light barrier extending between the tool mounts transversely to the working movement of the movable platform, wherein the first safety device has a first mount and a second mount, wherein one of the mounts carries a light emitter and the other mount carries a light receiver, and wherein the first mount is arranged on a first side of the first platform and is adjustable relative to the first platform by a first adjustment drive,
   a controller that is connected to the first adjustment drive,
   wherein the first tool mount comprises a guide rail configured to receive a bending tool, the guide rail comprising a first end having a first front side opening for changing the bending tool,
   wherein access for changing the bending tool via the first front side opening is obstructed in a first relative position of the first mount to the first platform and is unblocked in a second relative position of the first mount to the first platform,
   wherein the first tool mount has a clamping device for fixating at least one bending tool inserted in the guide rail,
   wherein the clamping device can be actuated between a clamping state and a releasing state,
   wherein the clamping device is actuatable by the controller and/or the clamping device has a state readable by the controller, and
   wherein, in an operating mode, the controller is configured to automatically move the first mount into the second relative position by controlling the first adjustment drive when the clamping device is brought into or is in a releasing state.

2. The bending press according to claim 1, wherein the second mount is arranged on a second side of the first platform opposite the first side and can be adjusted relative to the first platform by a second adjustment drive, wherein the controller is connected to the second adjustment drive, and wherein the guide rail comprises a second end having a second front side opening for changing the bending tool, and wherein access for changing the bending tool via the second front side opening is obstructed in a first relative position of the second mount to the first platform and is unblocked in a second relative position of the second mount to the first platform.

3. The bending press according to claim 2, wherein the first adjustment drive is actuatable independently of the second adjustment drive.

4. A method for operating the bending press according to claim 2, wherein the controller moves the first mount by controlling the first adjustment drive into the second relative position.

5. The method according to claim 4, wherein, in an operating mode, the controller automatically moves at least one of the first mount and the second mount into the second relative position by controlling the first adjustment drive, the second adjustment drive, or the first adjustment drive and the second adjustment drive when a covering is brought into or is in an open position and/or when the clamping device is brought into or is in a releasing state.

6. The method according to claim 4, wherein, in a first operating mode, the controller for performing a working movement moves the first platform in the direction of the second platform at a first speed, and moves at least one of the first mount and the second mount into the second relative position before the start of the bending operation on the workpiece or when the distance between a bending tool held by the first tool mount and the workpiece to be processed falls below a predefined value.

7. The method according to claim 4, wherein, in a second operating mode, the controller moves the first mount, the second mount, or the first mount and the second mount into the second relative position or leaves the first mount, the second mount, or the first mount and the second mount in the second relative position, before or while moving the first platform toward the second platform at a second speed for performing a working movement.

8. The method according to claim 7, wherein the first speed is greater than the second speed.

9. The bending press according to claim 2, wherein, in an operating mode, the controller is configured to automatically move the second mount into the second relative position by controlling the second adjustment drive when the clamping device is brought into or is in a releasing state.

10. The bending press according to claim 1,
    wherein in the first relative position of the first mount to the first platform, the first front side opening of the guide rail is covered at least partly by the first mount, and/or
    wherein in the first relative position of the second mount to the first platform, the second front side opening of the guide rail is covered at least partially by the second mount.

11. The bending press according to claim 1,
    wherein the first tool mount is an upper tool mount and the second tool mount is a lower tool mount, and/or
    wherein the first platform is movable relative to the second platform.

12. The bending press according to claim 1, wherein at least one of the light emitter and the light receiver is arranged in the lower region of the respective mount and is arranged above the front side opening(s) of the guide rail when the respective mount is in the second relative position.

13. The bending press according to claim 1, wherein the bending press comprises a second safety device, which can be brought into a state performing a safety function and into a non-securing state, and wherein the second safety device comprises a sensor for detecting the current state of the second safety device, which sensor is connected to the controller, and wherein the controller is configured to bring the first mount, the second mount, or the first mount and the second mount in dependence on the state of the second safety device detected by the sensor into the second relative position.

14. The bending press according to claim 13, wherein the bending press comprises a covering as a second safety device, wherein the covering is movable between a closed position, in which sideward access to the interior of the bending press is obstructed or impeded, and an open position.

15. The bending press according to claim 1, wherein, in a first operating mode, the controller is configured for performing a working movement to move the first platform in the direction of the second platform at a first speed, and to move the first mount, the second mount, or the first mount and the second mount into the second relative position before the start of the bending operation on the workpiece or when the distance between a bending tool held by the first tool mount and the workpiece to be processed falls below a predefined value.

16. The bending press according to claim 15, wherein, in a second operating mode, the controller is configured to move the first mount, the second mount, or the first mount and the second mount into the second relative position or to leave the first mount, the second mount, or the first mount and the second mount in the second relative position, before or while moving the first platform toward the second platform at a second speed for performing a working movement.

17. The bending press according to claim 16, wherein the first speed is greater than the second speed.

18. The bending press according to claim 1, wherein the light barrier is formed by at least one light beam.

19. The bending press according to claim 1, wherein the light receiver is an image receiver.

20. A method for operating the bending press according to claim 1, wherein the controller moves the first mount by controlling the first adjustment drive into the second relative position.

\* \* \* \* \*